June 14, 1960   O. E. KROLL   2,940,529
BEET HARVESTING MACHINE
Filed July 24, 1958   6 Sheets-Sheet 1

INVENTOR
Oscar E. Kroll

June 14, 1960

O. E. KROLL 2,940,529

BEET HARVESTING MACHINE

Filed July 24, 1958

INVENTOR

Oscar E. Kroll

June 14, 1960  O. E. KROLL  2,940,529
BEET HARVESTING MACHINE
Filed July 24, 1958
6 Sheets-Sheet 3

INVENTOR
Oscar E. Kroll

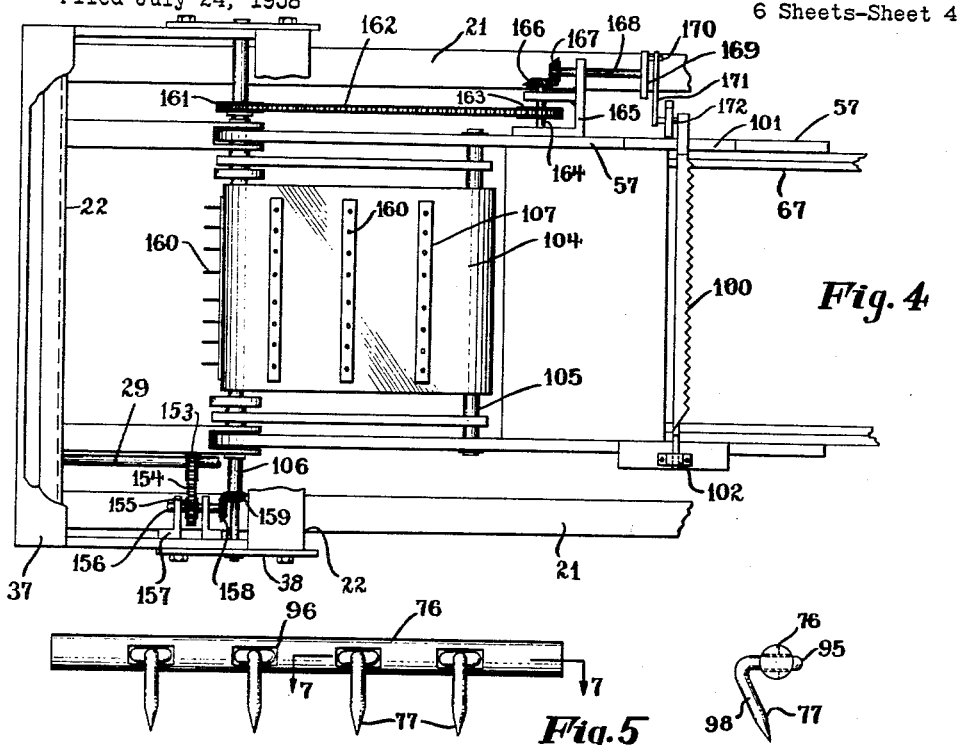
Fig. 4
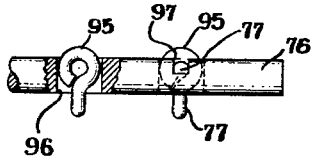
Fig. 5
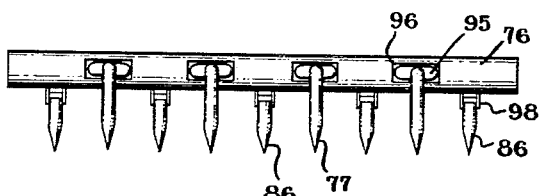
Fig. 7
Fig. 8
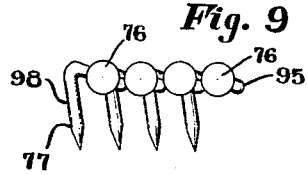
Fig. 6
Fig. 9
Fig. 10
INVENTOR
Oscar E. Kroll

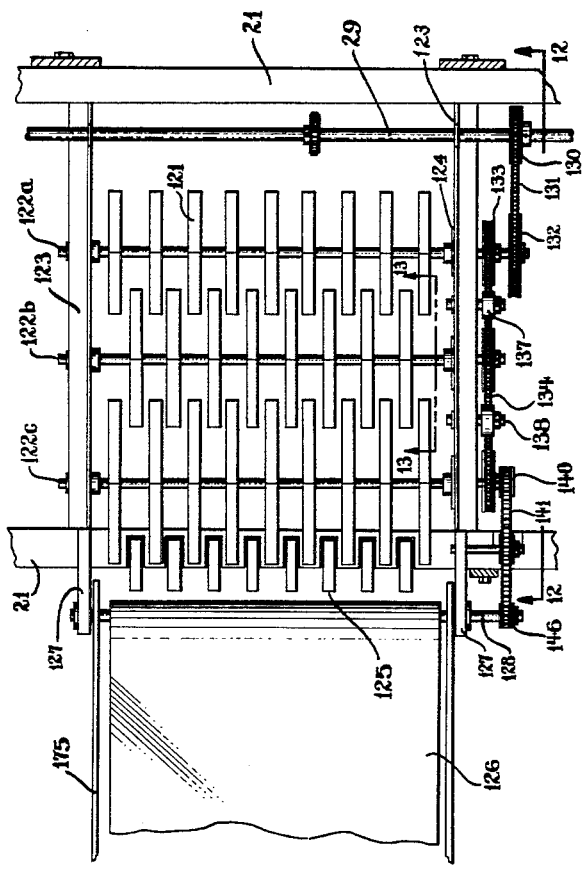
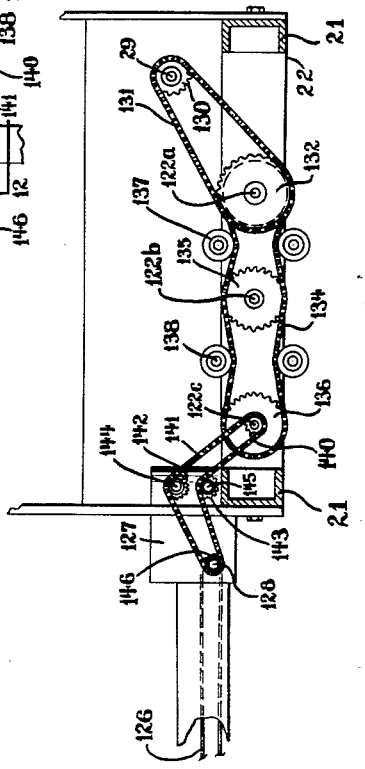
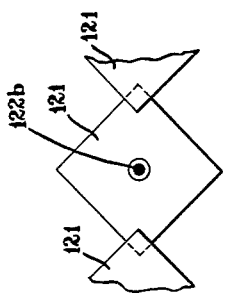

June 14, 1960
O. E. KROLL
2,940,529
BEET HARVESTING MACHINE
Filed July 24, 1958
6 Sheets-Sheet 6
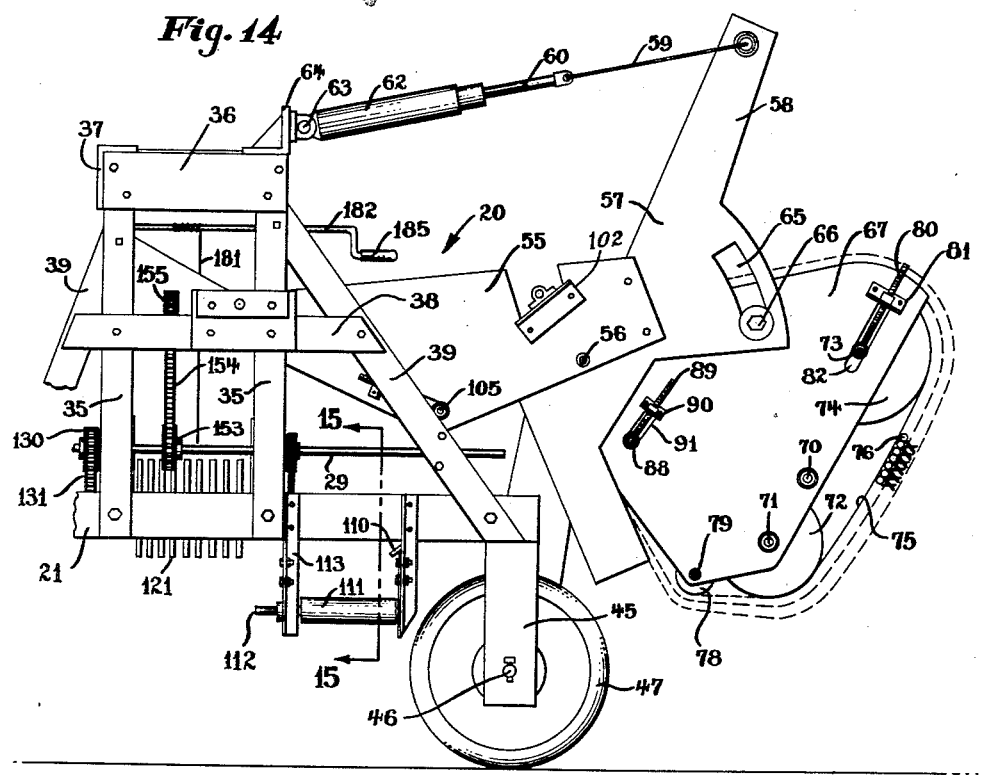
Fig. 14
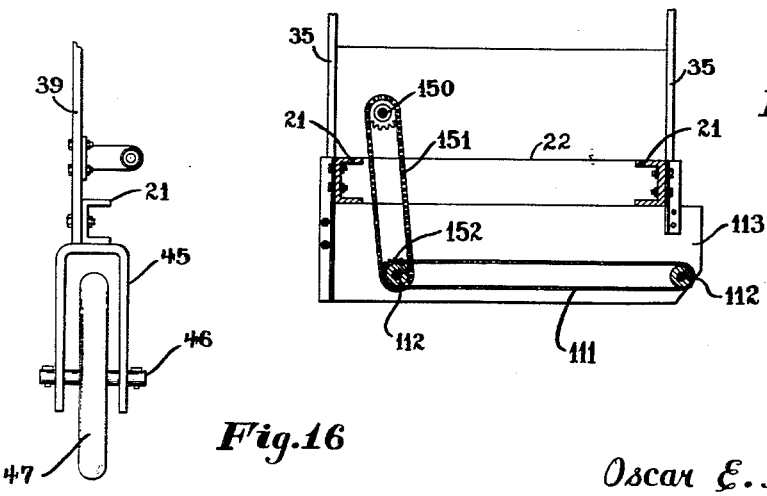
Fig. 15
Fig. 16
INVENTOR
Oscar E. Kroll

United States Patent Office 2,940,529
Patented June 14, 1960

2,940,529

BEET HARVESTING MACHINE

Oscar E. Kroll, 2026 T St., Sacramento, Calif.

Filed July 24, 1958, Ser. No. 750,633

3 Claims. (Cl. 171—53)

This invention relates to a beet harvesting machine, and has as its primary object the provision of an improved power driven machine which will harvest beets in an improved and expeditious manner.

Another object of the invention is the provision of such a device which will harvest beets, planted in irregular rows, and at unevenly spaced distances.

A further object of the invention is the provision of such a device provided with chain actuated picking fingers in spaced apart transverse relation, and oppositely inclined relative to each other, in such manner that at least two oppositely inclined fingers will engage a beet, a plurality of rows of fingers being employed in order that beets spaced out of alignment, or at different distances apart and of varying sizes may be harvested.

An additional object of the invention is the provision of such a device provided with means whereby the interengagement of the pair of fingers on each beet is discontinued after the beets have been removed from the ground, and wherein there is provided a beet topping device.

Still another object of the invention is the provision of means whereby the harvested beets and the cut tops are separated prior to transfer to a transporting vehicle.

It is also an object of the invention to provide an improved shaking device for shaking the beets and removing dirt from the same before transfer to a transporting vehicle.

It is a further object of the invention to provide means in association with such a mechanism whereby the cut or severed beet tops are moved out of the path of the harvesting machine and deposited in rows for subsequent removal.

It is an additional object of the invention to provide such a device including means whereby the harvesting mechanism may be raised from the ground for the transportation of the vehicle from place to place.

It is still another object of the invention to provide means for adjusting the beet harvesting chains and their associated fingers or teeth so they may be adjusted vertically to vary the plane of operation to meet various conditions.

A still further object of the invention is the provision of such a device which is sturdy and durable in construction, reliable and efficient in operation and relatively simple and inexpensive to manufacture and utilize.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

Figure 4 is an enlarged top plan view of the delivery end of the mechanism, parts thereof being broken away.

Figure 5 is an enlarged end elevational view of one of the endless belts with the picking fingers or teeth associated therewith.

Figure 6 is an end elevational view of the construction of Figure 5.

Figure 7 is a fragmentary elevational view, partially in section, taken substantially along the line 7—7 of Figure 5 as viewed in the direction indicated by the arrows.

Figure 8 is an elevational view of the structure of Figure 5 shown in association with the other conveying or picking belt carrying additional fingers or teeth.

Figure 9 is an end elevational view of a plurality of bars and fingers in association as shown.

Figure 10 is an end elevation view of the two finger or tooth carrying chains shown in association to illustrate the angular relation of the teeth.

Figure 11 is a top plan view illustrating the vibrating or shaking mechanism associated with the device.

Figure 12 is a sectional view taken substantially along the line 12—12 of Figure 11 as viewed in the direction indicated by the arrows.

Figure 13 is a fragmentary elevational view of the agitating elements for shaking the harvested beets.

Figure 14 is an enlarged elevational view of the rear end of the mechanism as shown in Figure 1 in a different position of adjustment.

Figure 15 is a sectional view taken substantially along the line 15—15 of Figure 14 as viewed in the direction indicated by the arrows.

Figure 16 is a fragmentary front elevational view of the steering wheel supporting the forward end of the device.

Similar reference characters refer to similar parts throughout the several views of the drawings.

Figure 1:
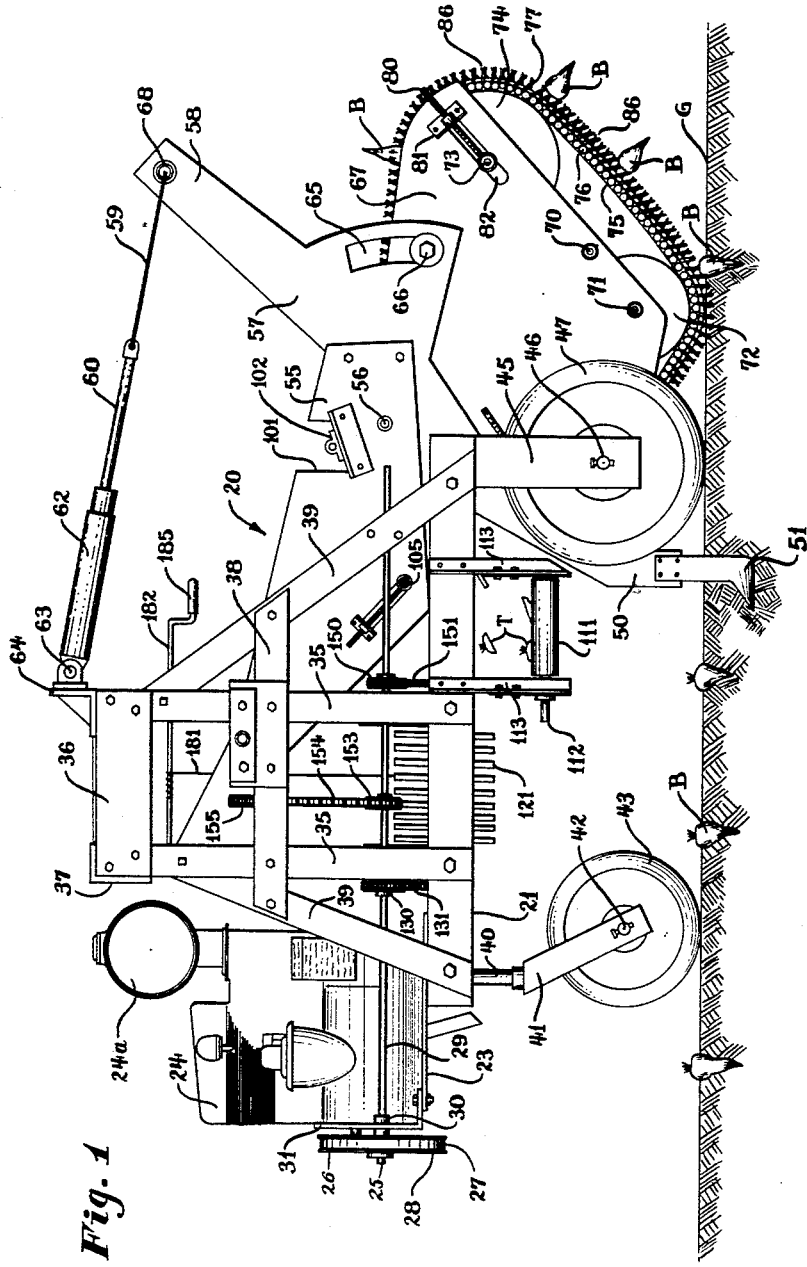
Figure 1 is a side elevational view of one form of beet harvester constructed in accordance with the instant invention.

Having reference now to the drawings in detail, there is generally indicated at 20 a beet harvester constructed in accordance with the instant invention, which includes a frame comprised of channel shaped side members 21, which are connected by suitable transversely extending channel members 22.

The forward part of the frame carries a plate 23 extending transversely across the forward ends of the frame members 21 and supported thereby. A conventional gasoline motor 24 having a fuel tank 24a is mounted on the plate 23, and includes a drive shaft 25, upon which is mounted a pulley 26. The pulley 26 drives a belt 27 which in turn runs over a pulley 28 carried by a drive shaft 29, mounted in suitable bushings 30 in upstanding member 31 carried by the forward end of the plate 23, and similar bearings (not shown) carried by the members 22. The purpose and operation of the shaft 29 will be more fully described hereinafter.

Longitudinally spaced uprights 35 extend upwardly from each of the side frame members 21, and are connected at their tops by side plates 36, and an end plate 37. A transverse reinforcing frame member 38 extends between each pair of uprights 35, and angularly disposed reinforcing members 39 extend downwardly and outwardly from the tops of members 35 to the lower frame members 21.

The forward end of each frame member 21 carries a shaft 40, upon which is swivelly mounted a fork 41, which carries a stub axle 42 upon which is mounted a dirigible wheel 43. Similarly the rear end of each member 21 has fixedly secured thereto a fork 45, which carries an axle 46 upon which is mounted a rear supporting wheel 47.

Depending plates 50 extend downwardly from the rear end of each of frame members 21, and carry plow points 51, for the purpose of agitating and digging the soil in advance of the beet harvesting mechanism, to be more fully described hereinafter.

Figure 2:
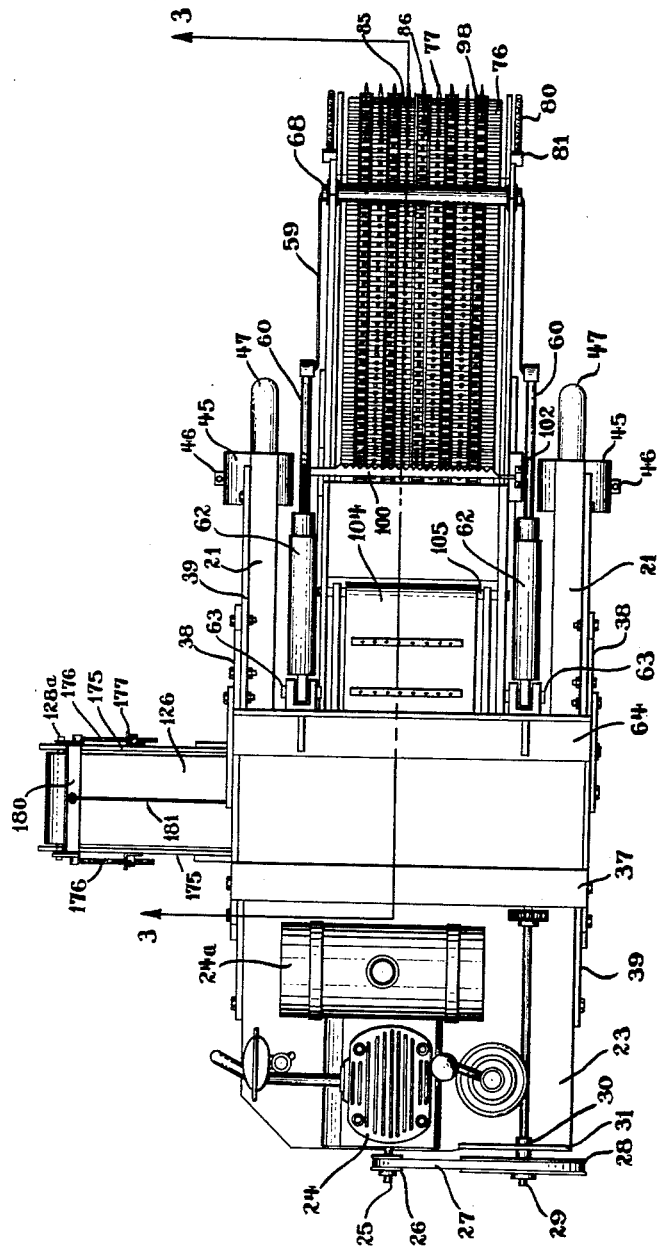
Figure 2 is a top plan view of the mechanism of Figure 1.

A pair of side plates 55 are suitably secured on opposite sides of the frame and are partially supported by the members 21, and additionally secured to the adjacent members 35. A transverse pivot rod 56 extends transversely between the extremities of the plates 55, and has pivotally mounted thereon a second pair of plates 57. The plates 57 have upwardly extending arms 58, to the upper extremities of which are secured wires 59, the opposite ends of which are connected to piston rods 60, which are secured to pistons (not shown) in hydraulic cylinders 62. The opposite ends of the cylinders 62 are pivotally connected as at 63 to an L-shaped bracket 64 extending across the rear ends of the rear pair of uprights 35 and supported thereby. Suitable fluid connections (not shown) are provided for the hydraulic cylinders 62, in order that the plates 57 and components carried thereby, to be more fully described hereinafter, may be raised or lowered, as desired, in a conventional manner. The lower portion of the plates 57 include arcuate slots 65, through which there extends a rod 66, which rod passes transversely through additional side plates 67, one of which is positioned on either side of the frame, and which support the components of the beet harvester, all as will be more fully described hereinafter. As best shown in Figure 2 a transverse tubular bar or shaft 68 extends between the upper extremities of the extensions 58 of plates 57, and the wires 59 pass therethrough, to provide a unitary connection with the associated hydraulic cylinders 62.

A reinforcing rod 70 extends between the two plates 67 adjacent their lower edges, and a shaft 71 having its ends journalled in the opposite plate 67 supports a friction roller 72. A second shaft 73 carries an additional friction roller 74, in spaced relation to the shaft 71, this roller serving to carry an endless chain 75 which is comprised by a plurality of circular bars 76, each of which is provided with a plurality of aligned teeth 77 angularly disposed with respect to its length. The chain 75 also passes around an idler roller 78 supported on a transverse shaft 79 journalled at its ends in the side plates 67.

Adjusting means are provided for the shaft 73, in order to control the tension of the endless chain 75, and takes the form of suitable screws 80 connected to the shaft 73, the screws being mounted in brackets 81 mounted on the outer sides of the plates 67, the shaft 73 being relatively movable in elongated slots 82 in the plates.

A plurality of endless chains 85 are also passed about the rollers 72, 74 and 78, on the opposite sides of the chain 75 comprised by the roller 76, and in spaced relation between the teeth 77 on the endless chain 75. The chain 85 carries teeth 86 which are also angularly disposed with respect to its length but at an opposite angle to the teeth 77 so that in effect the teeth cross, for the purpose of engaging a beet from opposite angles, in a manner and for a purpose to be more fully described hereinafter.

The teeth 86 are preferably slightly shorter than the teeth 77, and the teeth 77 project between the links of the chains 85, so that the crossing and projecting teeth extend outwardly beyond the lowermost or outermost chain 85 in the lower or ground engaging position of the chains. The chains 85, in addition to passing over the rollers 72, 78 and 74 also pass over an additional roller 87 which is mounted on a shaft 88 journalled in the upper portion of the plates 67 so that the path of travel of the chains 85 is greater than that of the endless chain 75, and the teeth 77 and 86 are separated during the upper flight of the chains 85.

Adjusting means for the rollers 87 and its associated shaft 88 are also provided, and take the form of screws 89 mounted in brackets 90 at the upper portions of the plate 67, the axle 88 being movable in elongated slots 91, for adjustment and tensioning of the chains 85.

As best shown in Figures 5, 6 and 7 each of the teeth 77 is formed angularly, and includes an end loop 95, which seats in a horizontally disposed recess 96 in the bar 76. Each bar 76 is additionally provided with a cutaway portion 97 in such manner that the pointed portion 98 of the teeth carried by the succeeding roller 76 may extend downwardly through the loop 95 of the teeth of the adjacent bar 76, thus securing the bars 76 and their associated teeth 77 in an endless chain. Any suitable securing means 98 may be provided for connecting the teeth 86 to the chains 85.

Figure 3:
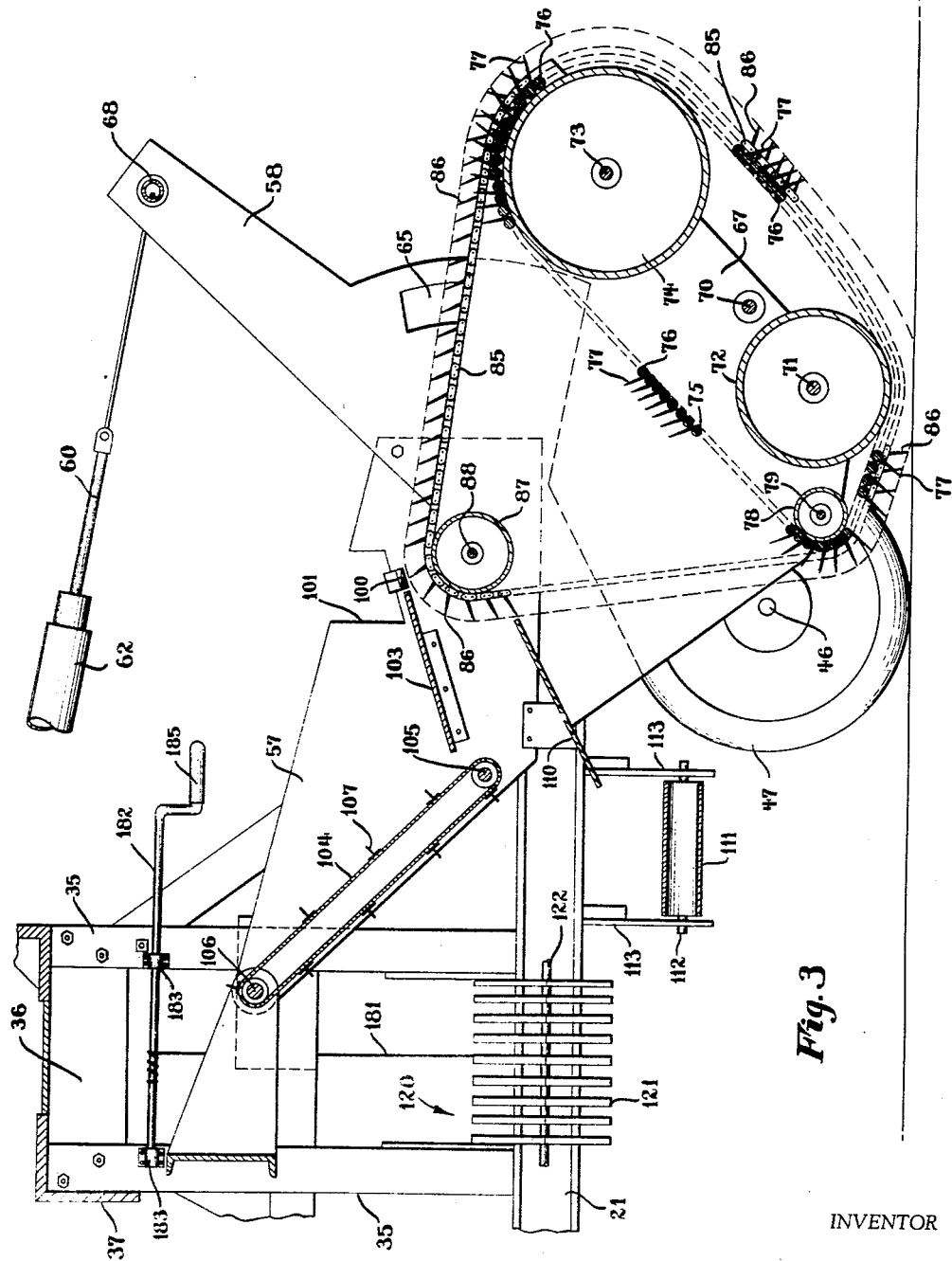
Figure 3 is an enlarged sectional view taken substantially along the line 3—3 of Figure 2 as viewed in the direction indicated by the arrows.

In the use and operation of the device so far described, the beet harvesting assembly is adapted to be positioned, by suitable adjustment of the hydraulic mechanism 62 in the position shown in Figure 1. The teeth 77 and 86 engage slightly in the ground G as shown in Figure 1, and are adapted to bite into beets B, due to the opposite angular relation thereof, and securely hold the beets while the latter are lifted upwardly as indicated in Figure 1. When the beets reach the top or level flight of the endless chains 75 and 85, due to the different paths of travel of the chains, as best shown in Figure 3, the teeth 77 and 86 separate, and the beets are conveyed upwardly by means of the chains 75, until they reach a cutter bar 100 which is seated in suitable slots 101 in the side plates 57. Suitable mounting brackets 102 are provided for the mounting of the cutter blade.

The beets as will be readily apparent are held in an upright position, and, after passing under the cutter blade 100, the topped beets are carried by a deflector plate 103 to an upwardly extending conveyor belt 104, which is rotatably mounted on shafts 105 and 106 positioned between the side plates 57, as best shown in Figure 3. Transverse cleats 107 are provided at suitable spaced intervals along the belt 104. The beet tops T being smaller and still held by the teeth 86 on the chains 85 are passed under the deflector plate 103, until they reach a downwardly inclined deflector plate 110, from which they are guided to a transversely extending conveyor belt 111. The belt 111 is carried by shafts 112, which extend transversely from uprights 113, which are carried by the side frame member 21.

The beets B are dropped from the end of the conveyor belt 104 to an agitating assembly generally indicated at 120, the latter being comprised by a plurality of staggered rectangular plates 121 mounted on shafts 122a, 122b, 122c, which extend longitudinally of the frame parallel to the side frame members 21, and are journalled in suitable journals 124 carried by transverse members 123. The direction of rotation of the shafts 122 is counterclockwise as viewed in Figure 11, and the beets are thus conveyed to the left. Guide fingers 125 are provided along the top edge of the inwardly positioned frame member 21 for conveying the topped, shaken and cleansed beets to a conveyor belt 126, which is mounted between suitable frame plates 127, and which is carried on a driven roller 128, and an idler roller (not shown). The belt 126 conveys the topped and cleansed beets to a suitable vehicle such as a truck or the like for transportation to any desired locality.

Drive means for the belts 111 and 126 are provided as well as for the shafts 122a, 122b and 122c and their associated agitator plates 121. Such means take the form of a sprocket 130 carried by the drive shaft 29 which, through a chain 131, drives a sprocket 132 mounted on one end of the shaft 122a. A second sprocket 133 is also mounted on the shaft 122a, and drives a chain 134 which extends over sprockets 135 and 136 carried by the shafts 122b and 122c, respectively. The chain 134 passes between suitable idlers 137, which are mounted on stub shafts 138 carried by the transverse frame member 123 adjacent the mountings for the shafts 122a and 122b.

The shaft 122c carries an additional smaller diameter sprocket 140 which drives a chain 141. The chain 141 extends over a pair of idler sprockets 142 and 143 carried by stub shafts 144 and 145 respectively, and in turn extends to and drives a sprocket 146 carried by the end of shaft 128 for the purpose of driving the conveyor belt 126. The shaft 29 also carries a sprocket 150, which, through a chain 151, as best shown in Figure 15, drives a sprocket 152, which is carried by one of shafts 112 for the purpose of driving the conveyor belt 111 for the beet tops.

An additional sprocket 153 is also carried by shaft 29, and through a chain 154 drives a sprocket 155 which, as best shown in Figure 4, is mounted on a stub shaft 156 carried by mounting brackets 157 mounted on the frame member 38. A bevel gear 158 carried by the shaft 156 drives a second bevel gear 159, which in turn drives the shaft 106 for the purpose of actuating the conveyor belt 104. As best shown in Figure 4 the transverse cleats 107 of the conveyor belt 104 are provided with fingers 160 which serve to impale the beets after they have moved off the fingers or teeth 86 of the chain 85. The opposite end of the shaft 106 carries a sprocket 161, which through a chain 162 drives a sprocket 163 mounted on a stub shaft 164 carried by a mounting bracket 165 which is mounted on one of plates 57. The shaft 164 carries a bevel gear 166, which in turn actuates another bevel gear 167 mounted on a shaft 168 carried by the mounting bracket 165, which also carries a disk 169 having an eccentric pin 170 thereon. The pin 170 is connected by a link 171 to a pin 172 carried by the end of the cutter bar 100 for reciprocating the same within the journals 102.

The other end of the conveyor belt 126 is supported on a roller or shaft 128a, carried by the extremities of a pair of frame members 175, adjusting means in the form of screw threaded rods 176 carried by brackets 177 being provided for tensioning the belt 126. A transverse bar 180 extends between the frame members 175 and has attached thereto a cord or cable 181. The other end of the cord 181 is carried by a shaft 182 mounted in journals 183 carried by the uprights 35 adjacent their tops. A crank arm 185 provides for rotation of the shaft 182 in order to raise or lower the end of the conveyor belt 126 and its associated frame. It is here pointed out that the driven roller 128 serves as a pivot for the raising and lowering of the belt 126, and its associated mechanism.

From the foregoing the use and operation of the device should now be readily understandable. With the parts in the position as shown in Figures 1 and 2 the assembly is suitably propelled, as by means of a tractor or the like, with the plates 67 in their lowered position so that the teeth 77 and on the endless chains 76 and 85, respectively, engage the surface of the ground, and dig slightly therein. The plow points 51 break the ground ahead of the digger components, and as the spaced apart rows of oppositely inclined teeth 77 and 86 engage a beet they are embedded in the body of the beet, which is then raised, as shown in Figure 1. When the beet is raised to the position wherein it rides on top of the teeth rather than being suspended thereby, the course of the endless chain 75 diverges so that only the teeth 86 on the endless chain 85 retain their grasp on the beet, which is then carried to the reciprocating cutter bar 100. The beet tops as previously mentioned drop to the deflector plate 110 and pass along same to the conveyor belt 111. Simultaneously the beets are carried by the deflector plate 103 to the endless conveyor belt 104, and at the upper shaft 106 supporting same are dropped upon the agitator plates 121. They are moved by these agitator plates toward the endless belt 126, upon which they are raised to a suitable height to be deposited in a truck or the like for removal.

The angle of the conveyor belt 126 may be varied by means of the operating crank 185. When it is desired to move the harvester from place to place, the entire assembly is raised by the actuation of suitable conventional hydraulic components (not shown) which in turn actuate the pistons within the cylinder 62 to raise the digger components about the pivot 56 to the position of Figure 14, whereupon the vehicle is ready for towing. Through the arrangement of the two oppositely disposed sets of teeth 77 and 86 on the endless chains 76 and 85 respectively, beets are firmly grasped and held and raised into position for topping and removal to the several conveyors. Obviously by provision of the alternate teeth 86 on the endless chains 85 relative to the teeth 77 on the belt endless chains 75, irregularly spaced rows of beets may be harvested, as well as beets planted an irregular distance apart.

From the foregoing it will now be seen that there is herein provided an improved beet harvester, which accomplishes all of the objects of this invention, and others, including many advantages of great practical utility and commercial importance.

As many embodiments may be made of this inventive concept, and as many modifications may be made in the embodiments herein before shown and described, it is to be understood that all matter herein is to be interpreted merely as illustrative and not in a limiting sense.

What I claim is:

1. A beet harvesting machine comprised by a frame, a pair of wheels disposed in parallel relationship in part supporting said frame for movement over the ground, plow points mounted on said frame in front of said wheels, a first roller rotatably mounted behind said pair of wheels and adjacent the ground level, a second roller rotatably mounted behind said first roller and also adjacent the ground level, a third roller rotatably mounted above and behind said first and second rollers, a first endless chain trained over said rollers and having inclined teeth thereon disposed transversely of its length, a fourth roller disposed above and in front of said first and second rollers, and a second endless chain trained over said four rollers running closely adjacent the first endless chain between the first and third rollers and having inclined teeth thereon disposed transversely of its length and adapted to interleave with the teeth on the first endless chain in the course of travel between the first and third rollers, whereby beets engaged by the interleaved teeth will be released from the first endless chain as the two chains pass over the third roller.

2. A beet harvesting machine comprised by a frame, a pair of wheels disposed in parallel relationship in part supporting said frame for movement over the ground, plow points mounted on said frame in front of said wheels, a pair of parallel plates pivotally mounted on said frame for movement from a lowered to a raised position, a first roller rotatably mounted between said pair of parallel plates and positioned behind said pair of wheels and adjacent the ground level, when the plates are in the lowered position, a second roller rotatably mounted between said pair of parallel plates and positioned behind said first roller and adjacent the ground level, when the plates are in the lowered position, a third roller rotatably mounted between said pair of parallel plates above and behind said first and second rollers, a first endless chain trained over said rollers and having inclined teeth thereon disposed transversely of its length, a fourth roller rotatably mounted between said pair of parallel plates and disposed above and in front of said first and second rollers, and a second endless chain trained over said four rollers running closely adjacent the first endless chain between the first and third rollers and having inclined teeth thereon disposed transversely of its length and adapted to interleave with the teeth on the first endless chain in the course of travel between the first and third rollers, whereby beets engaged by the interleaved teeth will be released from the first endless chain as the two chains pass over the third roller.

3. A beet harvesting machine comprised by a frame, a pair of wheels disposed in parallel relationship in part supporting said frame for movement over the ground, plow points mounted on said frame in front of said wheels, a pair of parallel plates pivotally mounted on said frame for movement from a lowered to a raised position, a first roller rotatably mounted between said pair of parallel plates and positioned behind said pair of wheels and adjacent the ground level, when the plates are in the lowered position, a second roller rotatably mounted between said pair of parallel plates and positioned behind said first roller and adjacent the ground level, when the parallel plates are in the lowered position, a third roller rotatably mounted between said pair of parallel plates above and behind said first and second rollers, a first endless chain trained over said rollers and having inclined teeth thereon disposed transversely of its length, a fourth roller rotatably mounted between said pair of parallel plates and in front of said first and second rollers, a reciprocatory cutter blade mounted above said fourth roller, and a second endless chain trained over said four rollers running beneath the reciprocatory cutter blade over the fourth roller and closely adjacent the first endless chain between the first and third rollers and having inclined teeth thereon disposed transversely of its length and adapted to interleave with the teeth on the first endless chain in the course of travel between the first and third rollers, whereby beets engaged by the interleaved teeth will be released from the first endless chain as the two chains pass over the third roller.

References Cited in the file of this patent
UNITED STATES PATENTS

| | | |
|---|---|---|
| 1,390,663 | Wyckoff | Sept. 13, 1921 |
| 1,723,777 | Godtell | Aug. 6, 1929 |
| 2,629,215 | Bowman et al. | Feb. 24, 1953 |